United States Patent
Hwang et al.

(10) Patent No.: US 9,210,712 B2
(45) Date of Patent: Dec. 8, 2015

(54) APPARATUS AND METHOD FOR CONTROLLING SUBCARRIER SPACING IN A WIRELESS COMMUNICATION SYSTEM

(75) Inventors: Sung Hyun Hwang, Daejeon (KR); Jung Sun Um, Daejeon (KR); Hoi Yoon Jung, Daejeon (KR); Gwang Zeen Ko, Daejeon (KR); Byung Jang Jeong, Daejeon (KR); Chang Joo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 335 days.

(21) Appl. No.: 13/822,578

(22) PCT Filed: Sep. 9, 2011

(86) PCT No.: PCT/KR2011/006732
§ 371 (c)(1), (2), (4) Date: Mar. 12, 2013

(87) PCT Pub. No.: WO2012/036439
PCT Pub. Date: Mar. 22, 2012

(65) Prior Publication Data
US 2013/0170464 A1    Jul. 4, 2013

(30) Foreign Application Priority Data

Sep. 13, 2010  (KR) .................. 10-2010-0089628
Mar. 22, 2011  (KR) .................. 10-2011-0025113

(51) Int. Cl.
| | | |
|---|---|---|
| H04W 4/00 | (2009.01) | |
| H04W 72/08 | (2009.01) | |
| H04J 11/00 | (2006.01) | |
| H04L 27/26 | (2006.01) | |

(52) U.S. Cl.
CPC ......... H04W 72/082 (2013.01); H04J 11/0023 (2013.01); H04L 27/2666 (2013.01); H04L 27/2691 (2013.01)

(58) Field of Classification Search
CPC ............ H04L 27/2665; H04L 27/2663; H04L 27/2675; H04L 27/2655; H04L 27/0008; H04L 27/2692; H04B 3/54; H04B 3/542
See application file for complete search history.

(56) References Cited

U.S. PATENT DOCUMENTS

| | | | | |
|---|---|---|---|---|
| 5,726,978 A | * | 3/1998 | Frodigh et al. ................ | 370/252 |
| 6,175,550 B1 | * | 1/2001 | van Nee ........................ | 370/206 |
| 2005/0002324 A1 | | 1/2005 | Sutivong et al. | |
| 2006/0115012 A1 | * | 6/2006 | Sadowsky et al. ............. | 375/260 |
| 2008/0240275 A1 | * | 10/2008 | Cai ............................... | 375/260 |
| 2010/0040080 A1 | | 2/2010 | Um et al. | |
| 2011/0158337 A1 | * | 6/2011 | Li et al. ......................... | 375/260 |
| 2011/0235728 A1 | * | 9/2011 | Karabinis ..................... | 375/260 |

(Continued)

FOREIGN PATENT DOCUMENTS

| | | |
|---|---|---|
| CN | 1753343 A | 3/2006 |
| CN | 1754336 A | 3/2006 |

(Continued)

*Primary Examiner* — Jung-Jen Liu
(74) *Attorney, Agent, or Firm* — William Park & Associates Ltd.

(57) ABSTRACT

Provided is an apparatus for controlling subcarrier spacing in a system supporting multiple frequency bands. The apparatus for controlling a subcarrier spacing comprises: an interference detection unit detecting interference over multiple frequency bands; a system parameter provision unit providing system parameters related to a subcarrier spacing between the multiple frequency bands—for example RF, FFT size, and channel bandwidth; a subcarrier spacing control unit controlling the subcarrier spacing such that the detected interference is reduced, on the basis of the system parameters. In a system operating with multiple bands, different subcarrier spacing can be applied by each band, thereby controlling interference occurring in each band.

15 Claims, 6 Drawing Sheets

(56) References Cited

U.S. PATENT DOCUMENTS

2012/0051458 A1* 3/2012 Lee et al. .................. 375/296
2013/0034091 A1* 2/2013 Kim et al. .................. 370/338

FOREIGN PATENT DOCUMENTS

| | | |
|---|---|---|
| CN | 1922791 A | 2/2007 |
| CN | 101772901 A | 7/2010 |
| JP | 2008283288 A | 11/2008 |
| JP | 2010517463 A | 5/2010 |
| KR | 10-2006-0131266 A | 12/2006 |
| KR | 10-2008-0089728 A | 10/2008 |
| KR | 1020100049909 A | 5/2010 |
| WO | 2006-020434 A2 | 2/2006 |
| WO | 2008-074734 A1 | 6/2008 |

* cited by examiner

FIG. 1

<CASE 1>

<CASE 2>

APPARATUS AND METHOD FOR CONTROLLING SUBCARRIER SPACING IN A WIRELESS COMMUNICATION SYSTEM

TECHNICAL FIELD

The present invention relates to a wireless communication, and more particularly, to an apparatus and a method for controlling subcarrier spacing.

BACKGROUND ART

A demand for a data transmission technology using multi-channels in order to increase a transmission rate has increased. In particular, the need of a transmission method simultaneously using a plurality of channel bandwidths positioned at different radio frequency (hereinafter, referred to as an RF) bands have come into the limelight. Examples using different radio frequency bands include orthogonal frequency division multiplexing (OFDM) inter-mode conversion by the Institute of Electrical and Electronics Engineers (IEEE) 802.11 series technology associated with a so-called wireless LAN (WLAN) or Wi-Fi and a cognitive radio (CR) communication using white spaces that exist in different RFs.

In the cognitive radio communication, a required channel bandwidth cannot be arbitrarily redesigned while a frequency plan is settled. Therefore, there is a limitation to compulsorily follow the existing frequency plan. However, since it is difficult to meet a desired transmission rate with a single channel bandwidth, a plurality of channel bandwidths positioned in different RFs are required to be used. An apparatus and a method for improving transmission performance by minimizing inter-carrier interference through adaptively controlling subcarrier spacing are required in an OFDM communication system.

DISCLOSURE

Technical Problem

The present invention provides an apparatus and a method for adaptively controlling subcarrier spacing in a wireless communication system.

The present invention also provides an apparatus and a method for reducing inter-carrier interference (ICI) in an OFDM communication system.

The present invention also provides an apparatus and a method for controlling inter-carrier interference for each band in a system that operates multi-bands.

Technical Solution

In an aspect, there is provided an apparatus for controlling subcarrier spacing in a system that supports multiple frequency bands. The apparatus for controlling subcarrier spacing includes: an interference detecting unit detecting interference which occurs throughout the multiple frequency bands; a system parameter providing unit providing system parameters associated with the subcarrier spacing to a subcarrier spacing controlling unit; and a subcarrier spacing controlling unit controlling the subcarrier spacing in order to reduce the detected interference based on the system parameters.

The system parameters associated with the subcarrier spacing may include, e.g., information on a radio frequency (RF), a fast Fourier transform (FFT) size, and a channel bandwidth.

As an exemplary embodiment, the interference detecting unit may detect the interference which occurs due to at least one of variation in the subcarrier spacing and distortion caused due to an RF difference.

As another exemplary embodiment, the interference detecting unit may provide interference information representing the detected interference to the subcarrier spacing controlling unit; and the subcarrier spacing controlling unit may determine whether or not to control the subcarrier spacing based on the interference information.

As yet another exemplary embodiment, the interference detecting unit may detect the interference for each frequency band.

As yet another exemplary embodiment, the subcarrier spacing controlling unit may control spacing of subcarriers on a frequency band in which the interference is relatively large among the multiple frequency bands.

As yet another exemplary embodiment, the subcarrier spacing controlling unit may control the subcarrier spacing by controlling the FFT magnitude.

As yet another exemplary embodiment, the subcarrier spacing controlling unit may transmit information on the controlled subcarrier spacing through a physical layer convergence protocol (PLCP) preamble.

As yet another exemplary embodiment, the subcarrier spacing controlling unit may transmit the information on the controlled subcarrier spacing through a PLCP header.

As yet another exemplary embodiment, the apparatus for controlling subcarrier spacing may further include a subcarriers allocating unit that allocates the subcarriers according to the controlled subcarrier spacing.

In another aspect, there is provided a method for controlling subcarrier spacing in a system that supports multiple frequency bands. The method for controlling subcarrier spacing includes: detecting interference which occurs throughout the multiple frequency bands; and controlling the subcarrier spacing in order to reduce the detected interference based on system parameters associated with the subcarrier spacing.

The system parameters associated with the subcarrier spacing may include, e.g., information on a radio frequency (RF), a fast Fourier transform (FFT) magnitude, and a channel bandwidth.

As an exemplary embodiment, the interference may occur due to at least one of variation in the subcarrier spacing and distortion caused due to an RF difference.

Another exemplary embodiment, the interference may be detected for each frequency band.

As yet another exemplary embodiment, the subcarrier spacing may be spacing of subcarriers on a frequency band in which the interference is relatively large among the multiple frequency bands.

As yet another exemplary embodiment, the subcarrier spacing may be controlled by controlling the FFT magnitude.

As yet another exemplary embodiment, the method for controlling subcarrier spacing may further include transmitting information on the controlled subcarrier spacing through a physical layer convergence protocol (PLCP) preamble.

As yet another exemplary embodiment, the method for controlling subcarrier spacing may further include transmitting the information on the controlled subcarrier spacing through a PLCP header.

As yet another exemplary embodiment, the method for controlling subcarrier spacing may further include allocating the subcarriers according to the controlled subcarrier spacing.

Advantageous Effects

In a system that operates multi-bands, interference that is increased in each band can be reduced due to the change of subcarrier spacing or the increase of an RF. Further, the present invention can be applied even when transmission modes having different subcarrier spacing are switched over to each other in a single RF band (a single band).

MODE FOR INVENTION

Exemplary embodiments of the present invention will be described more fully hereinafter so that those skilled in the art can easily implement the exemplary embodiments with reference to the accompanying drawings. As those skilled in the art would realize, the described embodiments may be modified in various different ways, all without departing from the spirit or scope of the present invention. In addition, parts not associated with description are omitted in order to clearly describe the present invention in the accompanying drawings and throughout the specification, like reference numerals refer to like elements.

Throughout the specification, unless explicitly described to the contrary, the word "comprise" and variations such as "comprises", will be understood to imply the inclusion of stated elements but not the exclusion of any other elements. Further, term "unit" described in the specification imply a unit of processing a predetermined function or operation and can be implemented by hardware or software or a combination of hardware and software.

Hereinafter, exemplary embodiments of the present invention will be described with reference to the accompanying drawings. Throughout the specification, a frequency band represents a frequency band which a predetermined communication system is permitted to use, such as a TV band, a 2.4 GHz (industrial, scientific and medical) ISM band, a 5 GHz ISM band, or the like. The ISM band represents a band which can be freely used in industrial, scientific, and medical fields without using permission. A multi-band represents multiple frequency bands. A channel bandwidth represents magnitudes of bands allocated to individual channels in each frequency band. A multi-channel represents multiple channel bandwidths.

Figure 1:
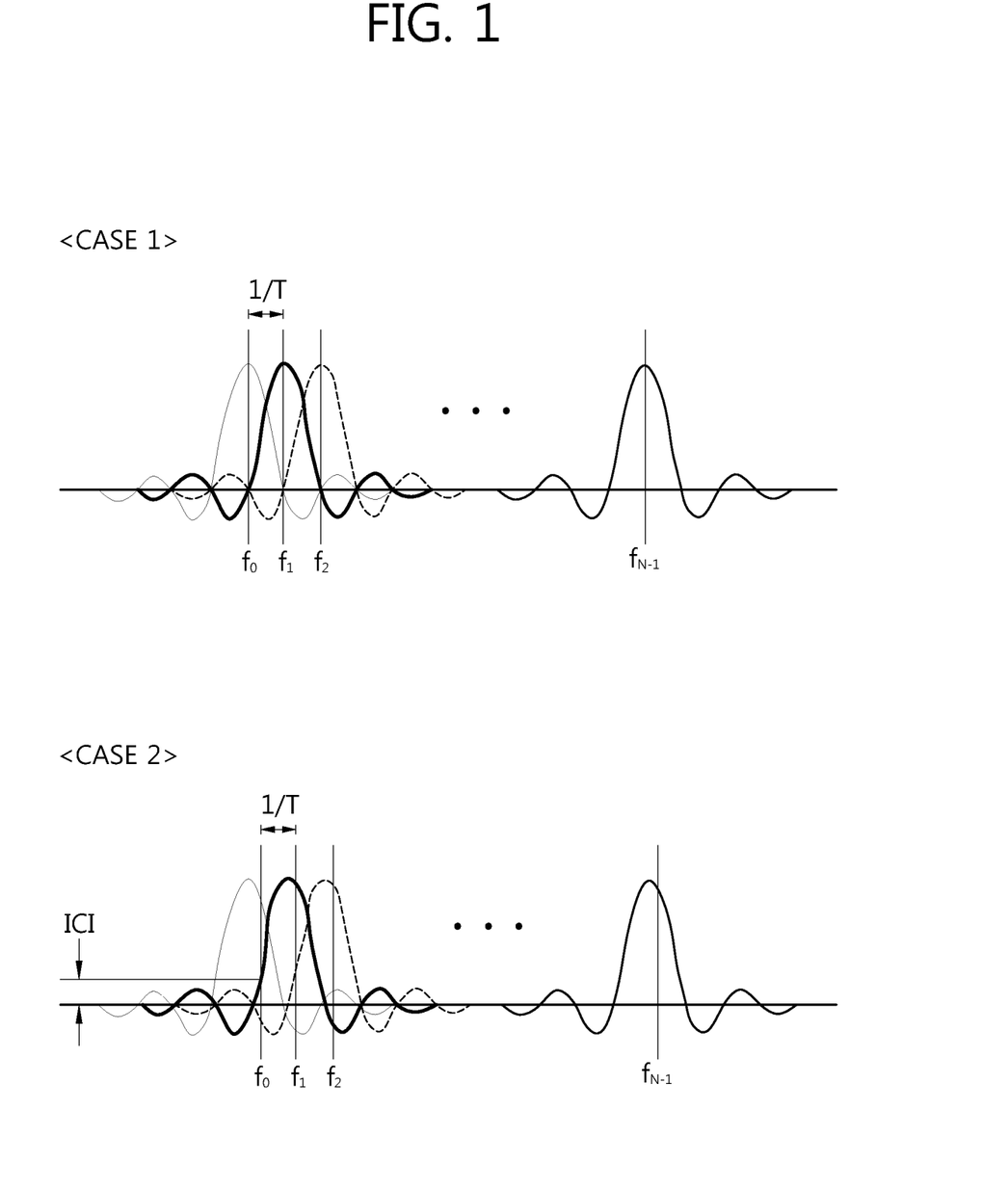
FIG. 1 shows an example in which inter-carrier interference occurs in an OFDM system.

FIG. 1 shows an example in which inter-carrier interference occurs in an OFDM system.

Referring to FIG. 1, Case 1 and Case 2 as an OFDM system using N subcarriers and central frequencies of the subcarriers are f0, f1, f2, ..., fN−1. In addition, the subcarrier spacing is 1/T.

In Case 1, since inter-carrier interference does not occur, orthogonality is maintained among the subcarriers. On the contrary, in Case 2, inter-carrier interference occurs, such that the orthogonality is not maintained among the subcarriers. Damage of the orthogonality in the OFDM system may a bit error rate (BER) or a packet error rate (PER) to be increased. In the OFDM system, robustness of the orthogonality among the subcarriers for frequency offset and phase noise is changed depending on the subcarrier spacing. The increase of the inter-carrier interference damages orthogonality of OFDM to deteriorate system performance. The inter-carrier interference may occur due to various causes other than the above cause.

Figure 2:
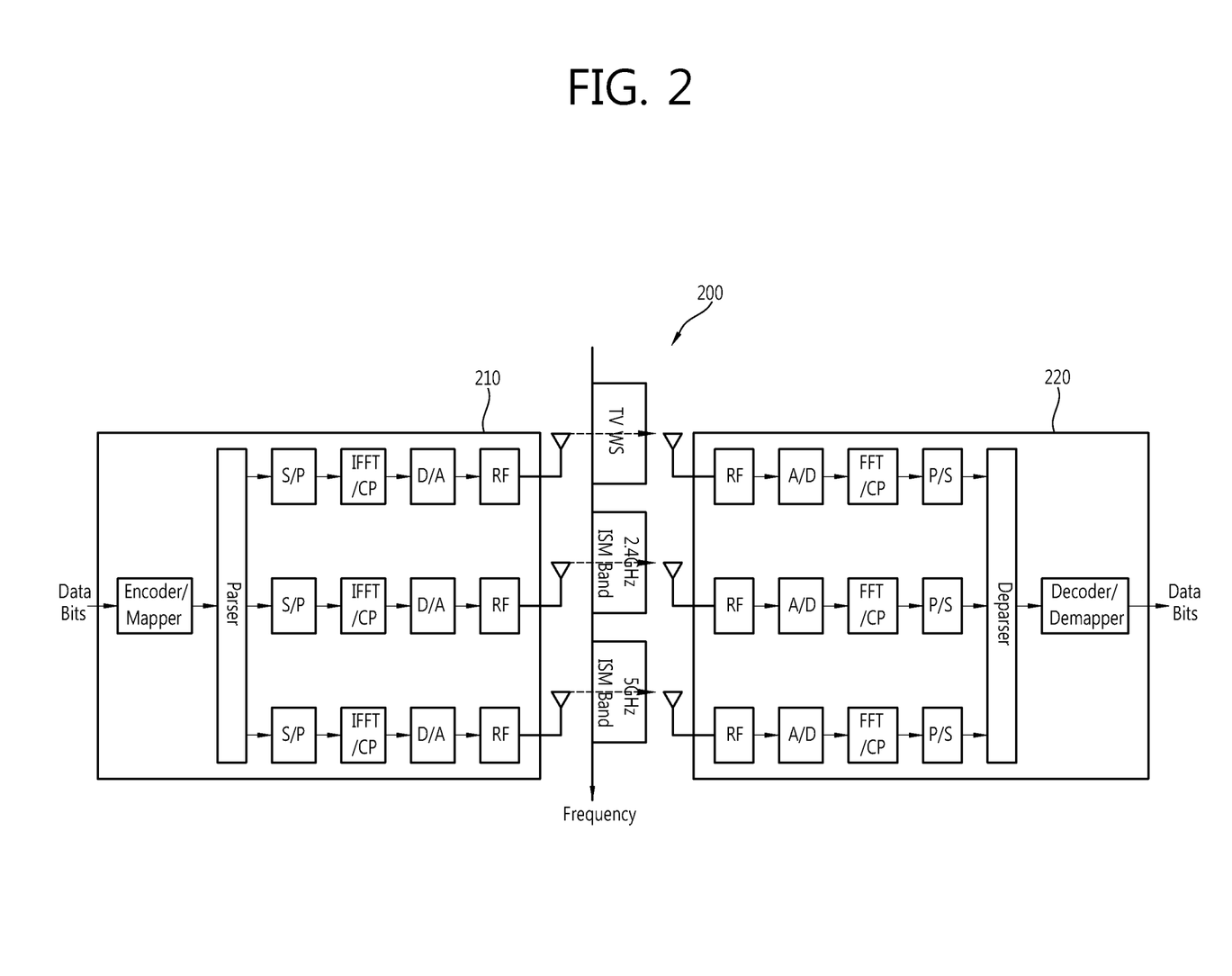
FIG. 2 is a block diagram showing a wireless communication system according to an exemplary embodiment of the present invention.

FIG. 2 is a block diagram showing a wireless communication system according to an exemplary embodiment of the present invention.

Referring to FIG. 2, a wireless communication system 200 includes a transmitter 210 and a receiver 220. As one example, the wireless communication system 200 may be an IEEE 802.11 system. The IEEE 802.11 system may be classified into 802.11a, 802.11g, 802.11n, and 802.11af depending on a transmission mode. A channel bandwidth and subcarrier spacing which can be supported are changed depending on a transmission mode as shown in FIG. 3.

Figure 3:
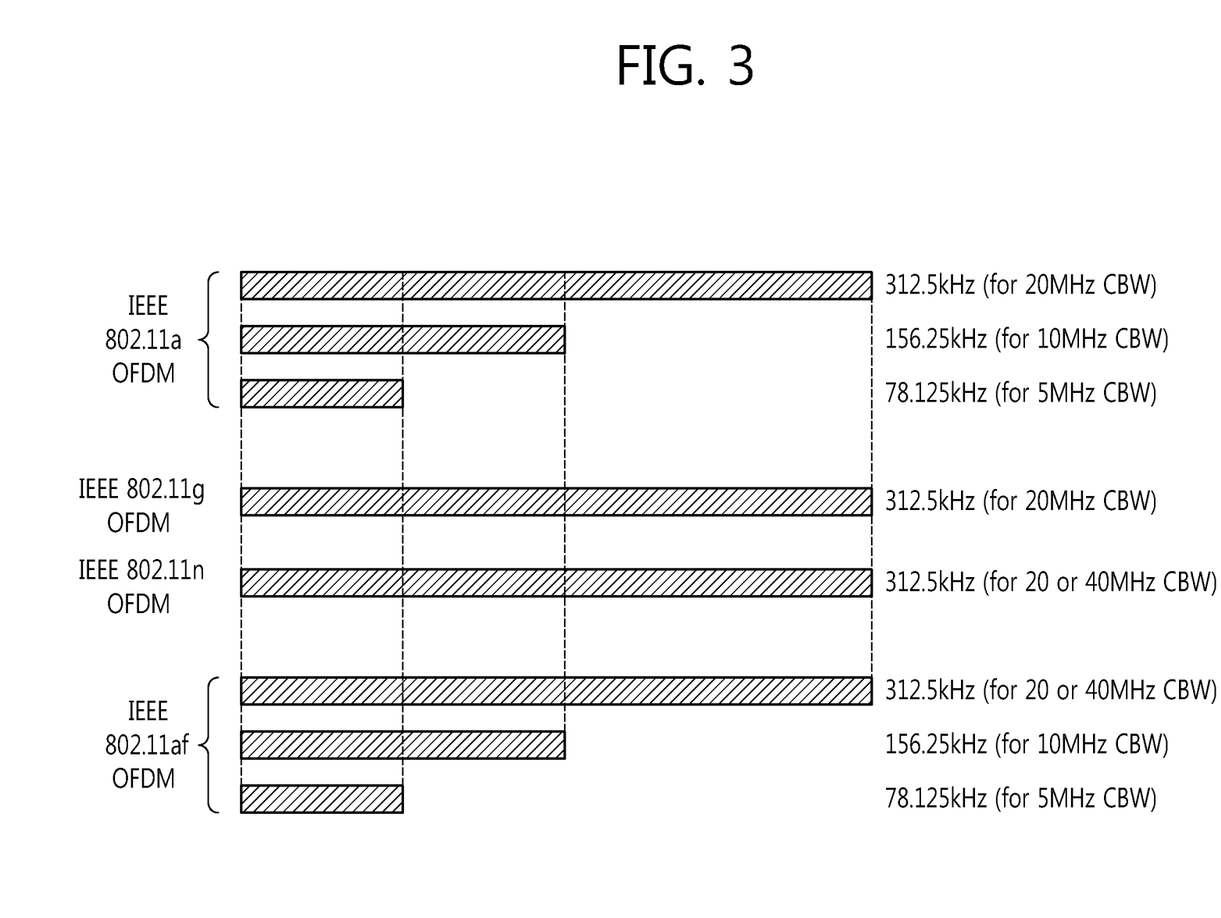
FIG. 3 shows an example in which subcarrier spacing is changed depending on a transmission mode according to an exemplary embodiment of the present invention.

Referring to FIG. 3, 802.11a supports channel bandwidths of 5 MHz, 10 MHz, and 20 MHz and the subcarrier spacings are 78.125 KHz, 156.25 KHz, and 312.5 KHz, respectively, depending on the magnitude of the channel bandwidth. 802.11g supports the channel bandwidth of 20 MHz and the subcarrier spacing is 312.5 KHz. 802.11n supports the channel bandwidth of 20 MHz or 40 MHz and the subcarrier spacing is 312.5 KHz. 802.11af supports the channel bandwidth of 5 MHz, 10 MHz, 20 MHz or 40 MHz and the subcarrier spacings are 78.125 KHz, 156.25 KHz, and 312.5 KHz, respectively.

Meanwhile, the transmitter 210 and the receiver 220 perform communication based on a single-channel mode, a multi-channel mode, a single-band mode, or a multi-band mode.

In each mode, the wireless communication system 200 may be switched to or operate as various cases as shown in Table 1.

TABLE 1

| | Number of bands | |
| Number of channels | Single | Multiple |
| --- | --- | --- |
| Single (within multi-channel) | SCoSB | SCoMB |
| Multiple (using multi-channel block) | MCoSB | MCoMB |

Referring to Table 1, mode switching includes a single channel transmission mode switching over single band (hereinafter, referred to as SCoSB), a simultaneous multiple channel transmission over single band (hereinafter, referred to as MCoSB), a single channel transmission mode switching over multiple band (hereinafter, referred to as SCoMB), and a simultaneous multiple channel transmission over multiple band (MCoMB).

In an example of the SCoSB, the channel bandwidth of 5 MHz is switched over to the channel bandwidth of 20 MHz in 802.11a. In an example of the MCoSB, the channel bandwidths of 5, 10, and 20 MHz are simultaneously transmitted in 802.11a. In an example of SCoMB, the channel bandwidth of 5 MHz of 802.11af is switched over to the channel bandwidth of 20 MHz of 802.11n. In an example of the MCoMB, the channel bandwidth of 20 MHz in 802.11a, the channel bandwidth of 20 MHz in 802.11g, and the channel bandwidth of 20 MHz in 802.11af are simultaneously transmitted.

Figure 4:
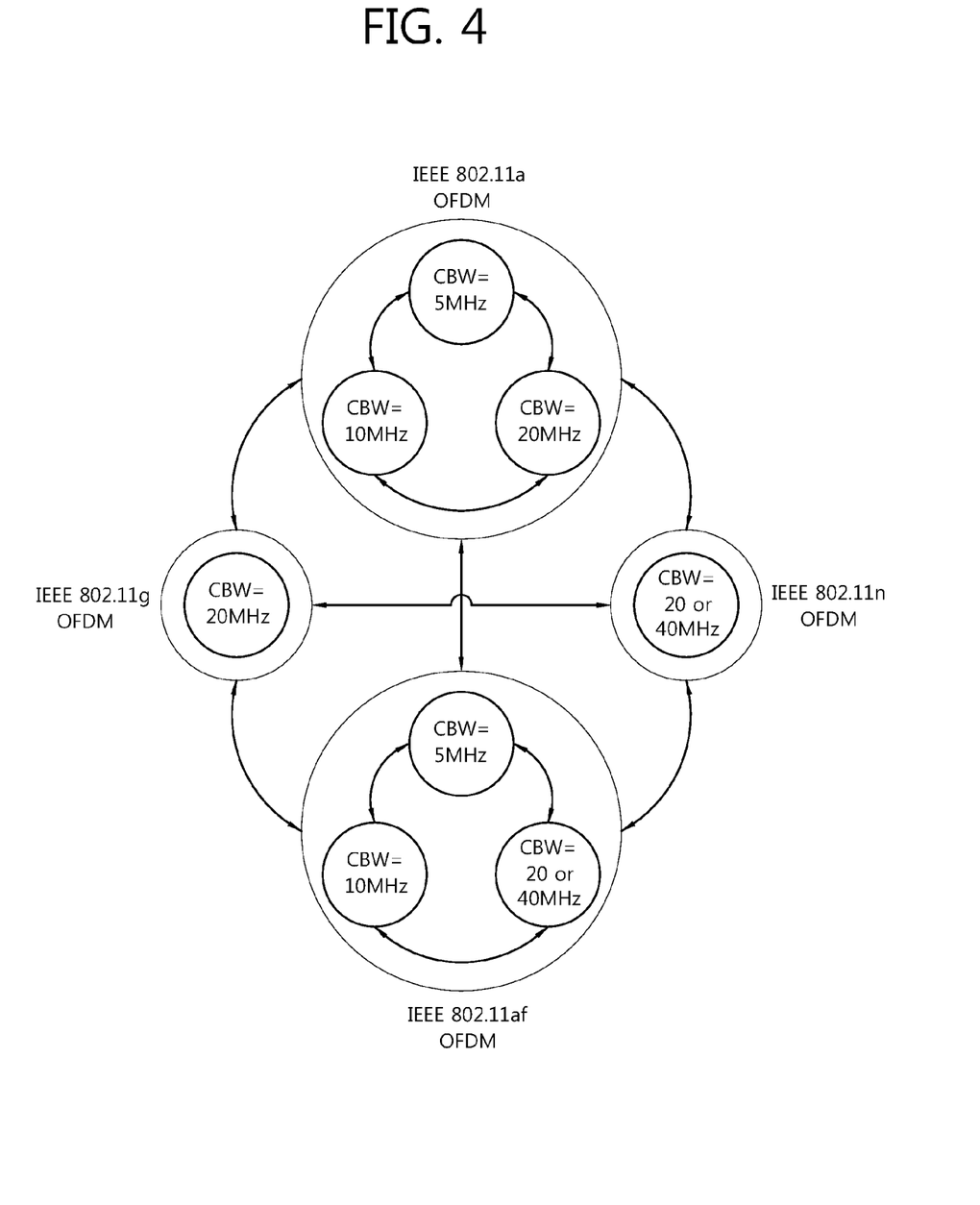
FIG. 4 is an explanatory diagram conceptually describing switch-over of a mode according to an exemplary embodiment of the present invention.

FIG. 4 is an explanatory diagram conceptually describing switch-over of a mode according to an exemplary embodiment of the present invention.

Referring to FIG. 4, RF characteristics and/or subcarrier spacing may be changed due to mode switching among a plurality of OFDM system standards having various subcarrier spacing values. As a result, phase noise and Doppler spread are changed. Consequently, the inter-carrier interference may be changed. When the channel bandwidths are different from each other, the subcarrier spacing may be changed even though the same fast Fourier transform (FFT) magnitude is applied.

Referring back to FIG. 2, the transmitter 210 and the receiver 220 performs communications through multi-channel bandwidths over the multi-band (TV WS, 2.4 GHz ISM band, and 5 GHz ISM band). The channel bandwidths (TV WS, 2.4 GHz ISM band, and 5 GHz ISM band) constituting the multi-channel are apart from each other by RF spacing of a predetermined level or more. In this case, an influence by the phase noise or Doppler spread may be changed due to different RF characteristics.

The influence by the phase noise is the inter-carrier interference which occurs due to destruction of orthogonality with random phase variation such as a common phase error (CPE). In general, when an RF frequency is changed from $f_1$ to $f_2$, a phase noise spectral density is changed by $20\log_{10}(f_2/f_1)$. That is, as the RF frequency increases, a 3 dB linewidth of the phase noise spectral density increases, such that the influence by the phase noise is further increased.

The inter-carrier interference which occurs due to the phase noise may be changed into signal-to-noise ratio degradation $D_{phase}$ as shown in Equation 1.

$$D_{phase} \approx \frac{11}{6\ln 10}4\pi\beta T\frac{S}{N} \qquad \text{[Equation 1]}$$

Where, $\beta$ represents the 3 dB linewidth, T represents a fast Fourier transformation (hereinafter, referred to as FFT) time, S/N represents an SNR value for acquiring approximately uncoded BER=$10^{-6}$. The reduction of an SNR by the phase noise increases in proportion to a ratio between the linewidth and the subcarrier spacing. Herein, the subcarrier spacing has a relationship of $f_{ss}=1/T$. For example, in a mode in which the channel bandwidth is 5 MHz of the IEEE 802.11a standard operating at 5 GHz, the 3 dB linewidth $\beta$ increases and the subcarrier spacing $f_{ss}$ decreases to ¼ as compared with the mode in which the channel bandwidth of the IEEE 802.11g standard operating at 2.4 GHz is 20 MHz. Accordingly, the inter-carrier interference by the phase noise increases the SNR degradation $D_{phase}$ by 4 times or more.

Meanwhile, the Doppler spread as one cause to generate frequency offset increases in proportion to the RF frequency. Maximum Doppler spread $f_{d,max}$ is defined as shown in the following equation.

$$f_{d,max} = \frac{f_c \cdot v}{c} \qquad \text{[Equation 2]}$$

Where, $f_c$ represents an RF frequency value, v represents the speed of a terminal, and c represents the speed of light. The inter-carrier interference which occurs by the frequency offset may be changed to the SNR degradation $D_{freq}$ as shown in Equation 3.

$$D_{freq} \approx \frac{11}{3\ln 10}\pi\Delta fT\frac{S}{N} \qquad \text{[Equation 3]}$$

Where, $\Delta f$ represents the frequency offset. The SNR degradation by the frequency offset increases in proportion to a ratio between the frequency offset and the subcarrier spacing, $\Delta fT=\Delta f/f_{ss}$. For example, in the mode in which the channel bandwidth is 5 MHz of the IEEE 802.11a standard operating at 5 GHz, the frequency offset by the Doppler spread increases and the subcarrier spacing $f_{ss}$ decreases to ¼ as compared with the mode in which the channel bandwidth of the IEEE 802.11g standard operating at 2.4 GHz is 20 MHz. Accordingly, the inter-carrier interference by the Doppler spread increases the SNR degradation $D_{freq}$ by 4 times or more.

Therefore, in a system that performs communications by using the multi-band, an apparatus and a method that can control interference in each band by appropriately controlling the subcarrier spacing are required. When the subcarrier spacing increases, the OFDM system becomes robust to the Doppler spread and the phase noise, but vulnerable to a multipath. When performance deterioration is large due to the multi-path, adaptive modulation and coding (AMC) needs to be robust (for example, a modulation rate is decreased from 64 QAM to 16 QAM) or the subcarrier spacing needs to be further narrowed.

Figure 5:
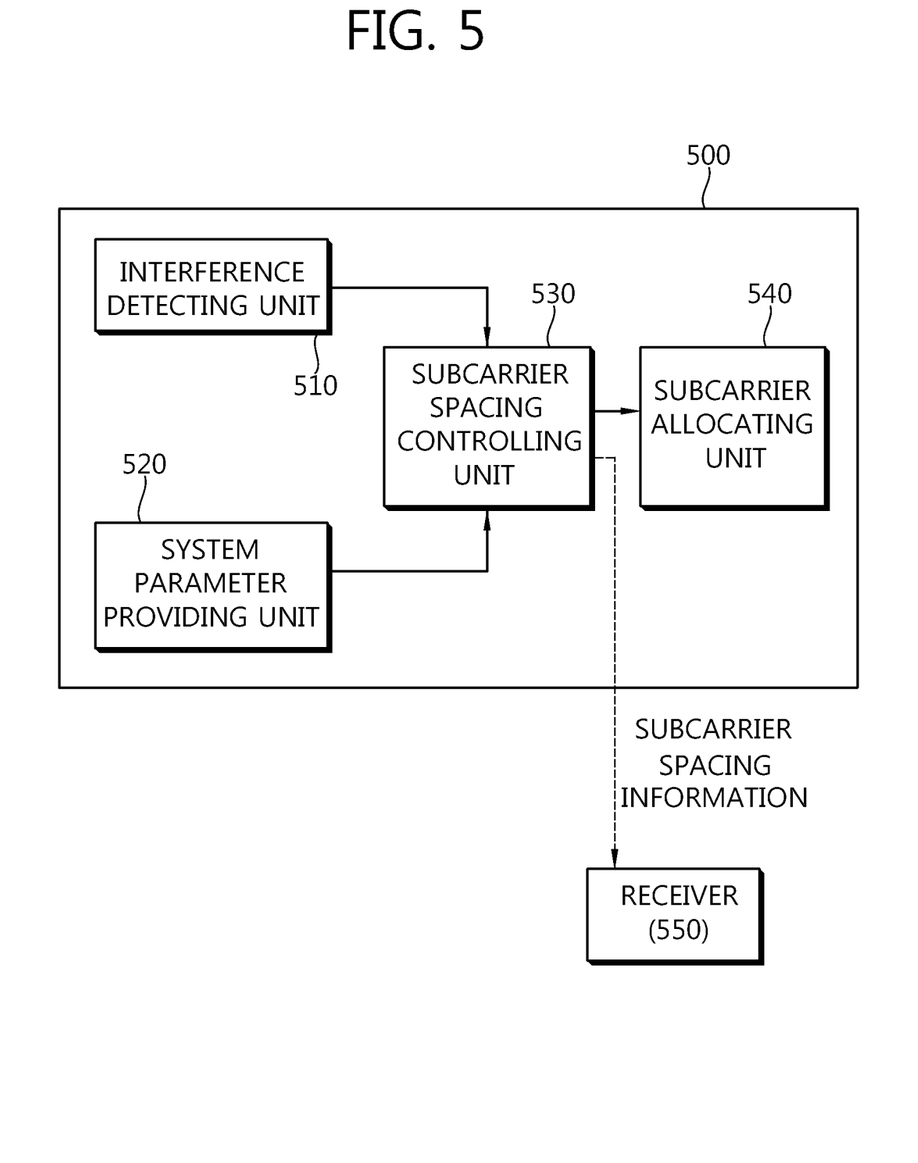
FIG. 5 is a block diagram showing an apparatus for controlling subcarrier spacing in a multi-band system according to an exemplary embodiment of the present invention.

FIG. 5 is a block diagram showing an apparatus for controlling subcarrier spacing in a multi-band system according to an exemplary embodiment of the present invention.

Referring to FIG. 5, a subcarrier spacing controlling apparatus 500 includes an interference detecting unit 510, a system parameter providing unit 520, a subcarrier spacing controlling unit 530, and a subcarrier allocating unit 540.

Herein, the subcarrier spacing controlling apparatus 500 may be included in a base station or a terminal that controls the subcarrier spacing or may exist as an independent entity. The subcarrier spacing controlling apparatus 500 may be a part of a transmitter or a part of a receiver 550. Hereinafter, assuming that the subcarrier spacing controlling apparatus 500 is included in the transmitter, an operation between the subcarrier spacing controlling apparatus 500 and the receiver 550 will be described. However, the subcarrier spacing controlling apparatus 500 may be included in the receiver 550. In this case, the operation between the subcarrier spacing controlling apparatus 500 and the receiver 550 to be described below may be similarly applied to an operation between the subcarrier spacing controlling apparatus 500 and the transmitter. The subcarrier spacing controlling apparatus 500 notifies subcarrier spacing information to the receiver 550. The subcarrier spacing information may be transferred to a plurality of receivers 550.

The transmitter including the subcarrier spacing controlling apparatus 500 transmits a signal based on the subcarrier spacing information. In particular, the subcarrier spacing information may be used for an OFDM modulator of the transmitter to perform OFDM modulation and used for an OFDM demodulator of the receiver 550 to perform OFDM demodulation.

The interference detecting unit 510 detects interference that occurs in a plurality of channel bandwidths or a plurality of frequency bands. The interference detecting unit 510 may detect interference that occurs due to variation in subcarrier spacing, distortion due to an RF difference, and the like as described above. The interference detecting unit 510 provides interference information representing the detected interference for each channel bandwidth or frequency band to the subcarrier spacing controlling unit 530.

The system parameter providing unit 520 provides system parameters such as the RF, the FFT size, the channel bandwidth, and the like associated with the subcarrier spacing to the subcarrier spacing controlling unit 530.

The subcarrier spacing controlling unit 530 determines whether the subcarrier spacing is required to be controlled based on the interference information. In addition, the subcarrier spacing is controlled to reduce the interference based on the system parameters provided from the system parameter providing unit 520 as necessary. The subcarrier spacing controlling unit 530 may control only subcarrier spacings included in a band in which the influence of the interference is relatively large among multiple or collectively control all the subcarrier spacings for the multi-bands when the influence of the interference of the multi-bands is generally large.

As an exemplary embodiment, the subcarrier spacing controlling unit 530 may set a preferable subcarrier spacing $f_{ss}$ that reduces the interference based on Equation 4 below.

$$f_{ss} = \frac{f_s}{N_{FFT}} \quad \text{[Equation 4]}$$

That is, the subcarrier spacing $f_{ss}$ may be acquired from a sampling frequency $f_s$ and an FFT magnitude $N_{FFT}$ and $f_{ss}$ may be exquisitely controlled by controlling $f_s$ and $N_{FFT}$.

The subcarrier spacing controlling unit 530 transmits subcarrier spacing information representing newly set subcarrier spacing to each receiver 550. As an exemplary embodiment, the subcarrier spacing controlling unit 530 may detect the subcarrier spacing information in each receiver 550 by a blind detection method without sending the subcarrier spacing information.

As another exemplary embodiment, the subcarrier spacing controlling unit 530 is included in the transmitter and transmits the subcarrier spacing information to the receiver 550 through a physical layer convergence protocol (PLCP) preamble.

As yet another exemplary embodiment, the subcarrier spacing controlling unit 530 is included in the transmitter and may transmit the subcarrier spacing information to the receiver 550 through a PLCP header.

As yet another exemplary embodiment, the subcarrier spacing controlling unit 530 may transmit the subcarrier spacing information to each receiver 550 through an additional control channel such as Beacon.

When the subcarrier spacing $f_{ss}$ is newly set by the subcarrier spacing controlling unit 530, the subcarrier allocating unit 540 transmits subcarriers to the receiver 550 according to the newly set subcarrier spacing $f_{ss}$.

As an exemplary embodiment, the subcarrier allocating unit 540 compares the existing subcarrier spacing $f_1$ with the newly set subcarrier spacing $f_{ss}$. If $f_1 > f_{ss}$, the subcarrier spacing needs to be narrowed, and as a result, the subcarrier allocating unit 540 arrange the subcarriers to narrow the spacing among the used subcarriers by allocating more subcarriers. In contrast, if $f_1 < f_{ss}$, the subcarrier spacing needs to be widened, and as a result, the subcarrier allocating unit 540 arranges the subcarriers to widen the spacing among the used subcarriers by periodically inserting null subcarriers between the existing allocated subcarriers.

When the subcarrier spacing is controlled as described above, distortion or interference caused due to the variation of the subcarrier spacing or the RF difference of the multi-band may be reduced and required quality of service (QoS) may be ensured by preventing performance from being rapidly deteriorated or overall performance from being deteriorated due to the most poor channel.

Figure 6:
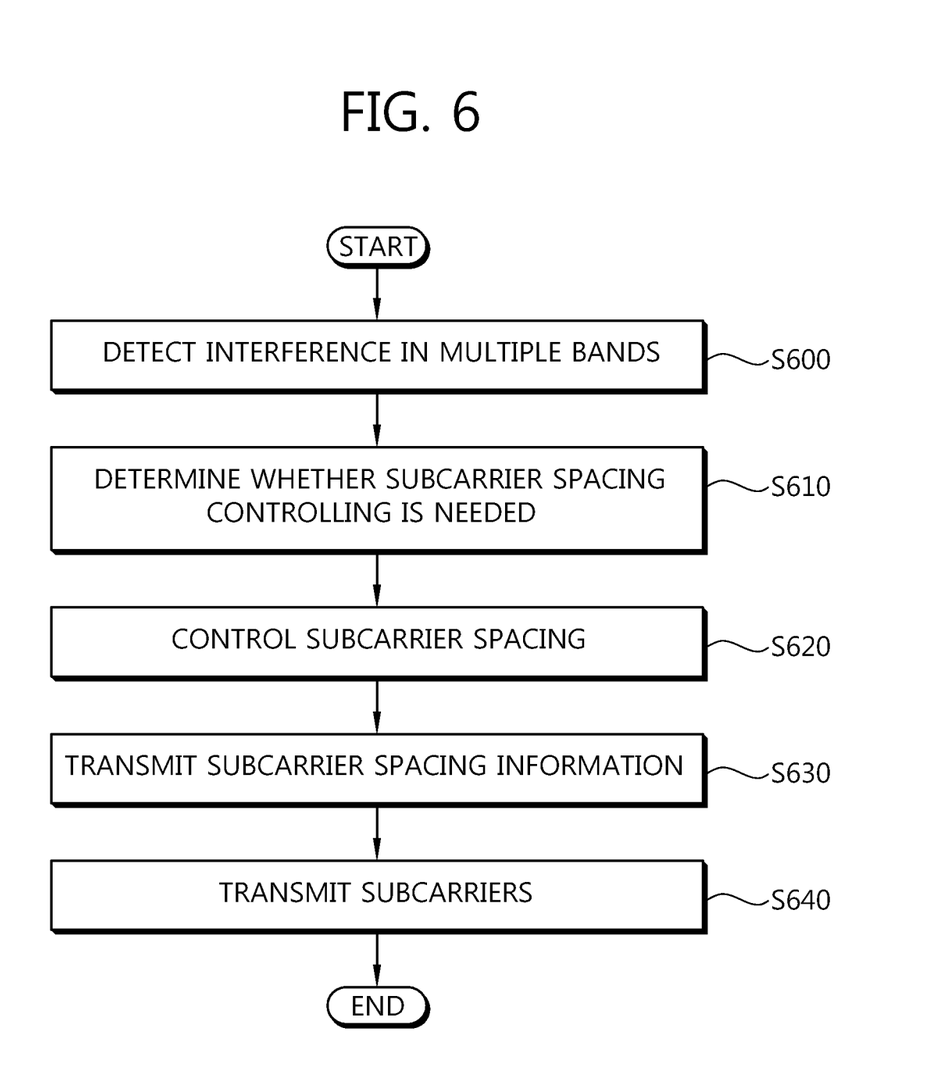
FIG. 6 is a flowchart describing an operation of an apparatus for controlling subcarrier spacing according to the present invention.

FIG. 6 is a flowchart describing an operation of an apparatus for controlling subcarrier spacing according to the present invention.

Referring to FIG. 6, the subcarrier spacing controlling apparatus detects interference that occurs multiple channel bandwidths or multiple frequency bands (S600). The interference may occur due to variation in subcarriers spacing, distortion caused due to an RF difference, and the like.

The subcarrier spacing controlling apparatus determines whether the subcarrier spacing needs to be controlled in order to reduce the detected interference (S610). If needed, the subcarrier spacing controlling apparatus controls the subcarriers spacing of the channel bandwidth or frequency band in order to reduce the interference based on system parameters associated with the subcarrier spacing, e.g., system parameters such as an RF, an FFT magnitude, the channel bandwidth, and the like (S620). The subcarrier spacing controlling apparatus may control only subcarrier spacings included in a band in which an influence of the interference is relatively large among the multiple bands or collectively control all the subcarrier spacings for the multi-bands when the influence of the interference of the multi-bands is generally large.

The subcarrier spacing controlling apparatus transmits subcarrier spacing information representing newly set subcarrier spacing to each receiver (S630). As an exemplary embodiment, the subcarrier spacing controlling apparatus may detect the subcarriers spacing information by using a blind detection method without transmitting the subcarrier spacing information. As another exemplary embodiment, the subcarrier spacing information may be transmitted through a PLCP preamble. As yet another exemplary embodiment, the subcarrier spacing information may be transmitted through a PLCP header. As yet another exemplary embodiment, the subcarrier spacing information may be transmitted through an additional control channel such as a beacon.

The subcarrier spacing controlling apparatus transmits subcarriers to the receiver according to the newly set subcarrier spacing (S640). As an exemplary embodiment, the subcarrier spacing controlling apparatus compares the existing subcarrier spacing $f_1$ with the newly set subcarrier spacing $f_{ss}$. If $f_1 > f_{ss}$, the subcarrier spacing needs to be narrowed, and as a result, the subcarrier spacing controlling apparatus allocates more subcarriers to arrange the subcarriers to narrow the spacing among the used subcarriers. In contrast, if $f_1 < f_{ss}$, the subcarrier spacing needs to be widened, and as a result, the subcarrier spacing controlling apparatus arranges the subcarriers to widen the spacing among the used subcarriers by periodically inserting null subcarriers between the existing allocated subcarriers.

When the subcarrier spacing is controlled as described above, distortion or interference caused due to the variation of the subcarrier spacing or the RF difference of the multi-band may be reduced and required QoS may be ensured by preventing performance from being rapidly deteriorated or overall performance from being deteriorated due to the poorest channel.

The spirit of the present invention has just been exemplified. It will be appreciated by those skilled in the art that various modifications and changes can be made without departing from the essential characteristics of the present invention. Accordingly, the exemplary embodiments disclosed in the present invention are used not to limit but to describe the spirit of the present invention. The scope of the present invention is not limited only to the embodiments. The protection scope of the present invention must be analyzed by the appended claims and it should be analyzed that all spirits within a scope equivalent thereto are included in the appended claims of the present invention.

The invention claimed is:

1. An apparatus for controlling subcarrier spacing in a system that supports multiple frequency bands, comprising:
   an interference detecting unit in communication with a subcarrier spacing controlling unit, the interference detecting unit detecting interference which occurs throughout the multiple frequency bands;
   a system parameter providing unit in communication with the subcarrier spacing controlling unit, the system parameter providing unit providing system parameters associated with the subcarrier spacing regarding the multiple frequency bands to the subcarrier spacing controlling unit;
   the subcarrier spacing controlling unit controlling the subcarrier spacing in order to reduce the detected interference based on the system parameters, wherein the system parameters include at least one of a radio frequency (RF), a fast fourier transform (FFT) magnitude, and a channel bandwidth information; and
   the subcarrier spacing controlling unit controlling subcarrier spacing for a first frequency band among the multiple frequency bands in which an influence of the interference is relatively large such that the subcarrier spacing of the first frequency band is different than the subcarrier spacing of the other frequency bands.

2. The apparatus of claim 1, wherein the interference detecting unit detects the interference which occurs due to at least one of variation in the subcarrier spacing and distortion caused by an RF difference.

3. The apparatus of claim 1, wherein:
   the interference detecting unit provides interference information representing the detected interference to the subcarrier spacing controlling unit; and
   the subcarrier spacing controlling unit determines whether or not to control the subcarrier spacing based on the interference information.

4. The apparatus of claim 1, wherein the interference detecting unit detects the interference for each frequency band.

5. The apparatus of claim 1, wherein the subcarrier spacing controlling unit controls the subcarrier spacing by controlling the FFT magnitude.

6. The apparatus of claim 1, wherein the subcarrier spacing controlling unit transmits information on the controlled subcarrier spacing through a physical layer convergence protocol (PLCP) preamble.

7. The apparatus of claim 1, wherein the subcarrier spacing controlling unit transmits information on the controlled subcarrier spacing through a PLCP header.

8. The apparatus of claim 1, further comprising a subcarrier allocating unit that allocates subcarriers according to the controlled subcarrier spacing.

9. A method for controlling subcarrier spacing in a system that supports multiple frequency bands, comprising:
   detecting interference which occurs throughout the multiple frequency bands;
   determining whether subcarrier spacing control is needed based on the detected interference;
   in response to determining that subcarrier spacing control is needed, controlling subcarrier spacing in order to reduce the detected interference based on system parameters associated with the subcarrier spacing regarding the multiple frequency bands, wherein the system parameters include at least one of a radio frequency (RF), a fast fourier transform (FFT) magnitude, and a channel bandwidth information; and
   wherein controlling the subcarrier spacing further includes controlling subcarrier spacing for a first frequency band among the multiple frequency bands in which an influence of the interference is relatively large such that the subcarrier spacing of the first frequency band is different than the subcarrier spacing of the other frequency bands.

10. The method of claim 9, wherein the interference occurs due to at least one of variation in the subcarrier spacing and distortion caused by an RF difference.

11. The method of claim 9, wherein the interference is detected for each frequency band.

12. The method of claim 9, wherein the subcarrier spacing is controlled by controlling the FFT magnitude.

13. The method of claim 9, further comprising transmitting information on the controlled subcarrier spacing through a physical layer convergence protocol (PLCP) preamble.

14. The method of claim 9, further comprising transmitting information on the controlled subcarrier spacing through a PLCP header.

15. The method of claim 9, further comprising allocating subcarriers according to the controlled subcarrier spacing.

* * * * *